United States Patent [19]
Pieterse et al.

[11] Patent Number: 5,335,739
[45] Date of Patent: Aug. 9, 1994

[54] AGRICULTURAL VEHICLE

[76] Inventors: Ian Pieterse, 355 Louise Street, Pretoria Tuine, Transvaal; Nicolaas Snyman, Doornlaagte, P.O. Box 1620, Rustenburg, Transvaal; Andre Minne, 75 Heron Road, Ninapark, Akasia, Transvaal, all of South Africa

[21] Appl. No.: 998,367

[22] Filed: Dec. 30, 1992

[51] Int. Cl.$^5$ .................................. B62D 11/04
[52] U.S. Cl. .................................. 180/6.3; 180/305; 180/900; 180/242
[58] Field of Search ............... 180/6.3, 252, 305, 900, 180/242

[56] References Cited

U.S. PATENT DOCUMENTS

| | | | |
|---|---|---|---|
| 3,003,779 | 10/1961 | Allison | 180/900 X |
| 3,770,076 | 11/1973 | Ward et al. | 180/305 |
| 4,159,749 | 7/1979 | Boushek, Jr. | 180/900 X |
| 4,320,810 | 3/1982 | Hillmann et al. | 180/6.3 |
| 4,444,287 | 4/1984 | Voelz | 180/252 |
| 4,805,719 | 2/1989 | Kostamo | 180/307 X |
| 4,917,200 | 4/1990 | Lucius | 180/6.3 X |

FOREIGN PATENT DOCUMENTS

| | | | |
|---|---|---|---|
| 0071573 | 2/1983 | European Pat. Off. | 180/900 |
| 3511647 | 10/1986 | Fed. Rep. of Germany | 180/900 |
| 2560143 | 8/1985 | France | 180/900 |
| 8602893 | 5/1986 | PCT Int'l Appl. | 180/900 |

*Primary Examiner*—Eric Culbreth
*Assistant Examiner*—C. Mattix
*Attorney, Agent, or Firm*—Lahive & Cockfield

[57] ABSTRACT

A high crop agricultural vehicle has a chassis supported at an elevated position on front and rear sets of wheels. The front wheels are turnable through an arc of greater than 90° so that they can be turned to a lateral travel position which is perpendicular to the direction of normal forward travel. In that lateral travel position the vehicle can be driven sideways. This allows the vehicle to be easily manoeuvred as well as facilitating the mounting of agricultural implements into the space between the front and rear wheels. The rear wheels are preferably momented in a castor-type mounting assembly.

8 Claims, 8 Drawing Sheets

AGRICULTURAL VEHICLE

BACKGROUND TO THE INVENTION

This invention relates to an agricultural vehicle and more particularly to a tractor type agricultural vehicle.

There are very many different types of tractors available for agricultural functions and farmers generally choose the type of tractor which will suit the particular crops they intend producing. Many tall growing crops such as maize and tobacco cannot be worked after they have grown to a reasonable height by conventional low level tractors. High crop tractors have been developed in which the drivers cab and engine are mounted at an elevated position which is able to pass over a row of crops being worked or harvested. In use, the tractor wheels run on either side of the particular row or rows of crops.

One problem with this arrangement is that a farmer needs to own two separate tractor type vehicles in order to properly tend to his crops during their full growing cycle. This, of course, adds considerably to his capital outlay and accordingly, indirectly, adds to the cost of the crops. Conventional high crop tractors have their own disadvantages. Many prior art tractors are not easily steered and in many fields they have difficulty in negotiating turns at the end of each row of crops. Also, most high crop tractors are not easily adaptable to perform different functions other than the high crop function they have been specifically designed and built for.

A further significant problem is that the actual process of mounting the agricultural implements to high crop tractors can be difficult. Many agricultural implements are wider than the tractor itself. For high crop tractors it is desirable to mount the implement in the space between the front wheels and the rear wheels. When the implement is wider than the vehicle itself the implement somehow needs to be manoeuvred into the space between the front and rear wheels in order to couple the implement to the vehicle. Since such implements tend to be heavy and cumbersome this manoeuvring is not achieved without considerable difficulty.

SUMMARY OF THE INVENTION

According to the invention there is provided a high crop agricultural vehicle comprising, a chassis on which is mounted a drive unit and a drivers cab with steering and drive controls, a pair of front wheels mounted to the chassis and spaced apart from each other, a pair of rear wheels mounted to the chassis and spaced apart from each other, the wheels supporting the chassis at an elevated position such that, in use, the vehicle can be driven over relatively high crops, drive means linking the drive unit to the front wheels, steering means controllable by the steering controls which is capable of steering the vehicle to the left and right of a normal forward travel direction, the front wheels being turnable to at least through 90° either to the left or right of said normal forward travel direction so that the front wheels adopt a lateral travel position, the vehicle being capable of being driven in a lateral direction when the front wheels are in said lateral travel position.

An agricultural vehicle according to the invention may have a number of other inventive features, not all of which need to be incorporated into a particular vehicle in order to enjoy the advantages of the invention. An important feature is that the front wheels are steerable by conventional type steering mechanism as well as being steerable simultaneously or alternatively by brake or skid type steering. The conventional steering mechanism is preferably pneumatically or hydraulically operated. In one arrangement the front wheels are driven by a pair of hydraulic or electric drive motors, one drive motor within each front wheel, the hydraulic or electric drive motors in turn being driven by an internal combustion engine mounted on the vehicle via a hydraulic pump or generator as the case may be. This type of drive arrangement is easily controllable for brake or skid type steering.

The front wheels are preferably each mounted to the chassis through a mounting arrangement which includes a pivot assembly having a vertical pivot axis, the two front wheels being linked together by a linkage adapted to ensure they remain parallel with each other.

It is preferred that the rear wheels of the agricultural vehicle are mounted in a castor type mounting assembly which will facilitate turning on a small turning circle. The castor type mounting assembly may be lockable in a forward travel position.

It is preferable that the vehicle chassis is formed of two substantially independent frames connected together by a pivoting connection arrangement, the pivot axis being aligned with the direction of conventional forward travel of the vehicle. The whole drive arrangement and drive motors will preferably be mounted on the front frame together with the drivers cab. In one arrangement, the rear frame carries no drive arrangement or control arrangement whatsoever. The rear frame can, if required, be detached from the front frame and replaced with some other form of rear frame assembly, such as a truck rear frame.

It is also preferred that the front frame carries a substantially conventional three point connection arrangement to which standard agricultural implements such as ploughs, harvesters or the like can be attached. Agricultural implements will be supported between the front and rear sets of wheels. This arrangement, coupled with the fact that the vehicle is a front wheel drive vehicle, will enhance the traction of the vehicle. With this arrangement, the vehicle can be used as both a low crop tractor and a high crop tractor and implements which will be fitted thereto will depend on the function to be performed on a particular crop at a particular stage in the growing cycle.

An embodiment of the invention is described in detail in the following passages of the specification which refer to the accompanying drawings. The drawings, however, are merely illustrative of how the invention might be put into effect, so that the specific form and arrangement of the various features shown in not to be understood as limiting on the invention.

DESCRIPTION OF A PREFERRED EMBODIMENT

As shown in the drawings, an agricultural vehicle has a chassis 1 which includes a front frame 2 and a rear frame 3 pivotally connected together through pivot arrangement 4. The pivot arrangement 4 is located relatively near to the front wheels 5 which provides a large and stable load carrying bed 6 on the rear frame 3. Rear wheels 7 support the rear of the vehicle and those wheels 7 are connected to the rear frames 3 by means of a castor type assembly 8. The castor type assembly 8 includes a mounting sleeve 9 having a pivot axis 10 in which a shaft 11 is mounted. The rotational axes 12 of the rear wheels 7 is horizontally offset from the pivot axis 10 with the effect that the rear wheel 7 always follow behind the direction of travel of the front wheel 5 in conventional castor wheel fashion.

A drivers cab 13 is mounted vertically above the front wheels 5 which provides the driver with an uninterrupted view forward of the vehicle. As will be clear from FIG. 2 the driver cab 13 is offset to one side of the vehicle. A drive unit in the form of an internal combustion engine 15, such as a diesel engine, is mounted, also generally above the front wheels 5, to the right-hand side of the cab 13. The engine 15 may be a 3770cc Deutz F4L 912 Diesel engine. The internal combustion engine 15 is operable to drive an hydraulic pump 17 for the drive and power operation of the vehicle. These aspects will be described in more detail herebelow. This embodiment is described as having hydraulic drive motors within each drive wheel. It is to be understood that other power systems are possible such as electric motors powered by a generator which could be driven by engine 15.

The front wheels 5 are drive wheels for the vehicle. Each wheel 5 includes an hydraulic drive motor 20 which is co-axially mounted within the central hub 21 of the wheel 5. The hydraulic pump 17 which is driven by the engine 15 supplies fluid under pressure for the driven motors 20. Maximum forward drive speed of the vehicle will be about 15 km/h. The driver is able to control the supply of fluid to the two motors 20 independently in order to drive the two motors 20 at different speeds from each other. The effect of this will be that the driver is able to steer vehicle by simply driving one wheel 5 faster than the other wheel 5. If a really sharp turn is required, one wheel 5 can be stopped or even reversed and other wheel driven forward. This type of brake type steering may be required where it is necessary to effect a sharp turn at the end of a row of crops, for example. The term "skid steering" means steering by means of accelerating one drive wheel to a speed faster than the other drive wheel. The drive arrangement of this vehicle thus can include skid type steering.

It will be noted that the front wheels 5 are connected to the frame via generally vertical support arms 22. These arms have a lower end 24 to which the hydraulic motors 20 are connected. The upper ends 26 of the arms 22 each terminate in a vertically aligned shaft 28 which is journalled into a bearing 29 which in turn is fixed to the front frame 3. This shaft and bearing assembly thus defines a pivot assembly for each front wheel, the pivot axis 30 for each being vertical. The conduits for conveying hydraulic fluid from the pump 17 to the motors 20 are not shown but will be sufficiently flexible, at least in some locations, to permit pivoting of the arms 22 about pivot axes 30. Each pivot axis 30 is vertically above the respective rotational axes 32 of each front wheel and passes through a vertical plane 34 through of each wheel. This arrangement allows for relatively easy turning of the wheels 5 on their axes 30.

Figure 1:
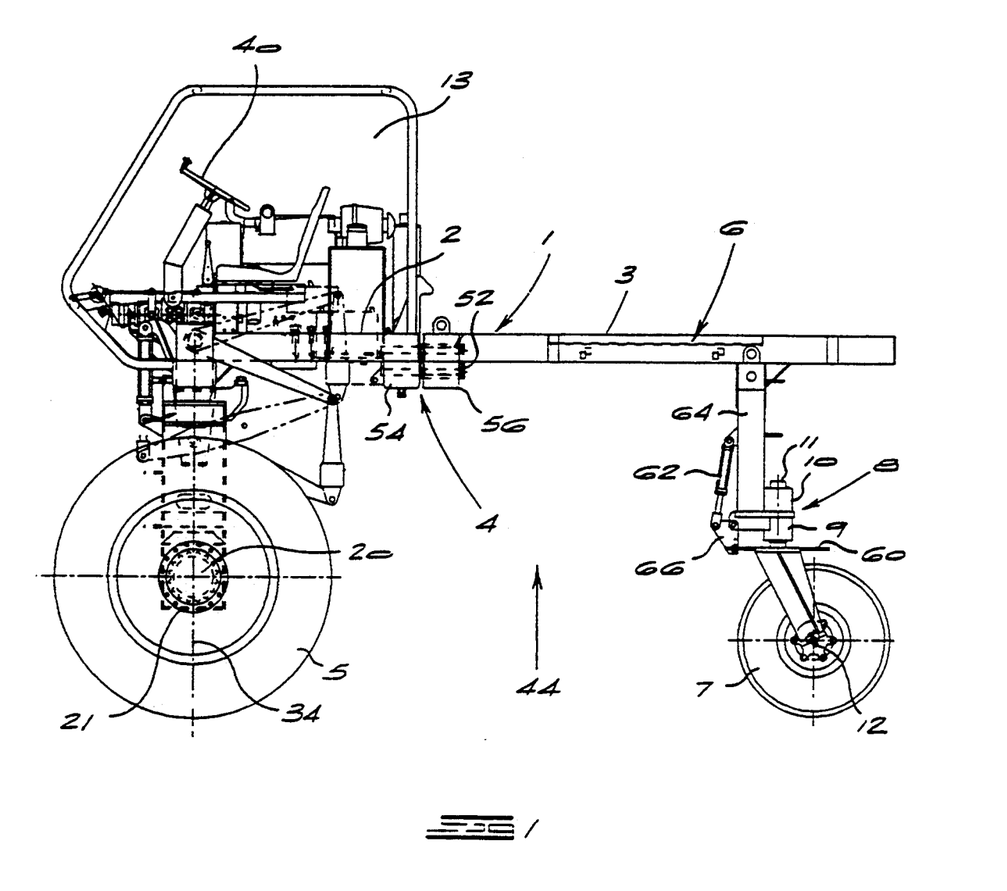
FIG. 1 shows a side view of an agricultural vehicle according to the invention.
Figure 2:
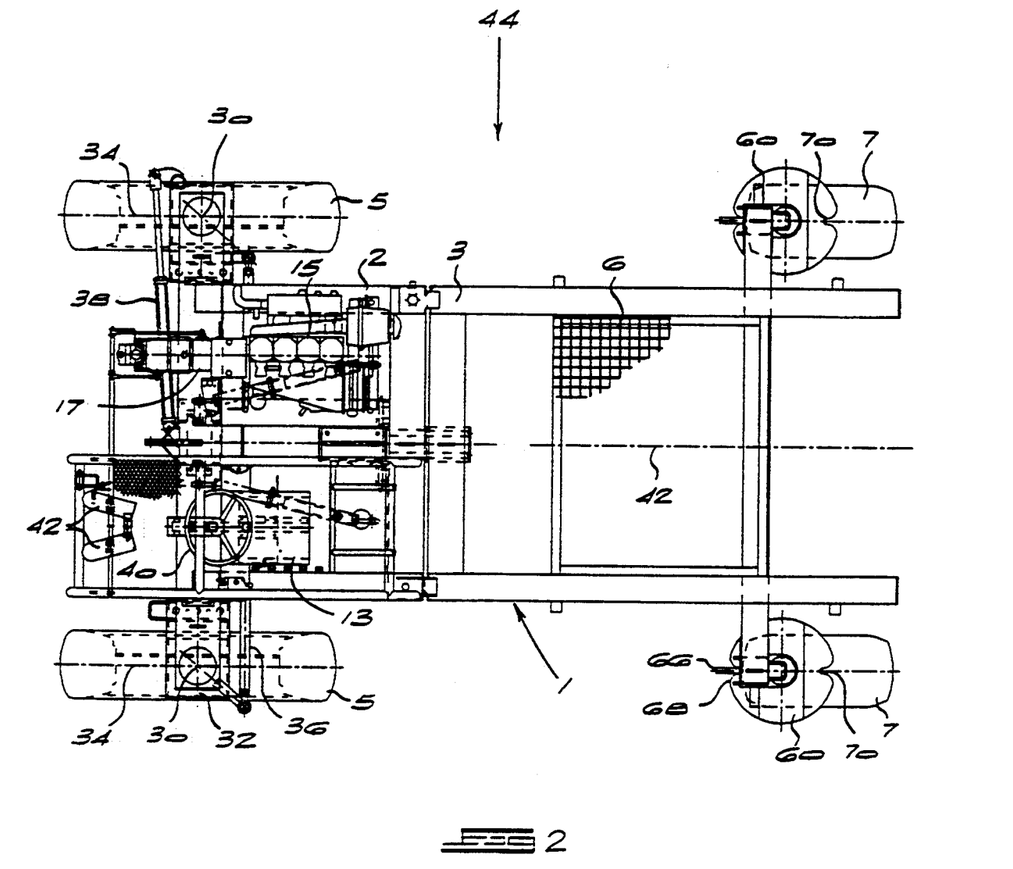
FIG. 2 shows a plan view of the vehicle shown in FIG. 1.
Figure 3:
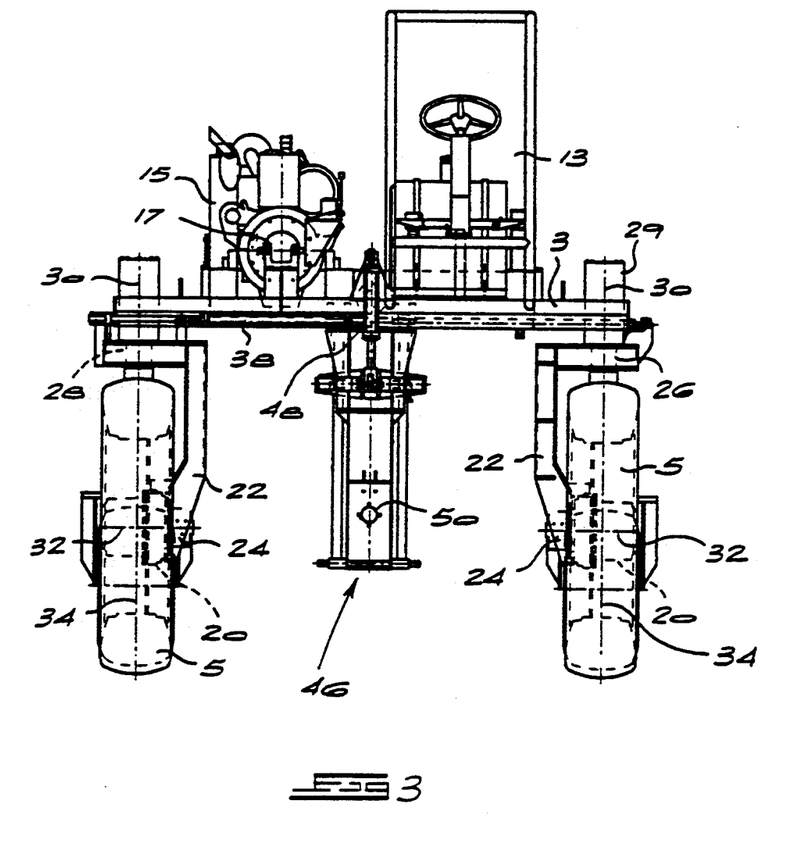
FIG. 3 shows a front view of the vehicle shown in FIG. 1.
Figure 5:
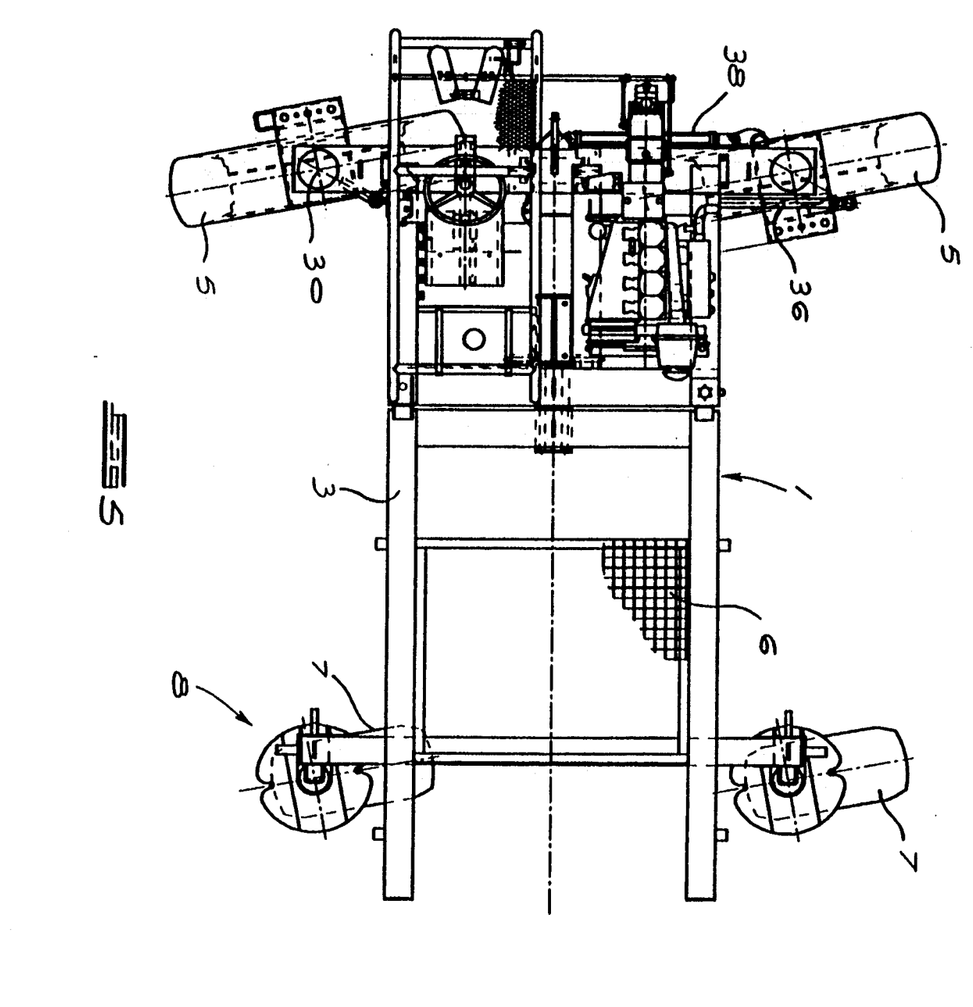
FIG. 5 shows a similar view to that of FIG. 2 with the wheels turned at 100° to the left.
Figure 7:
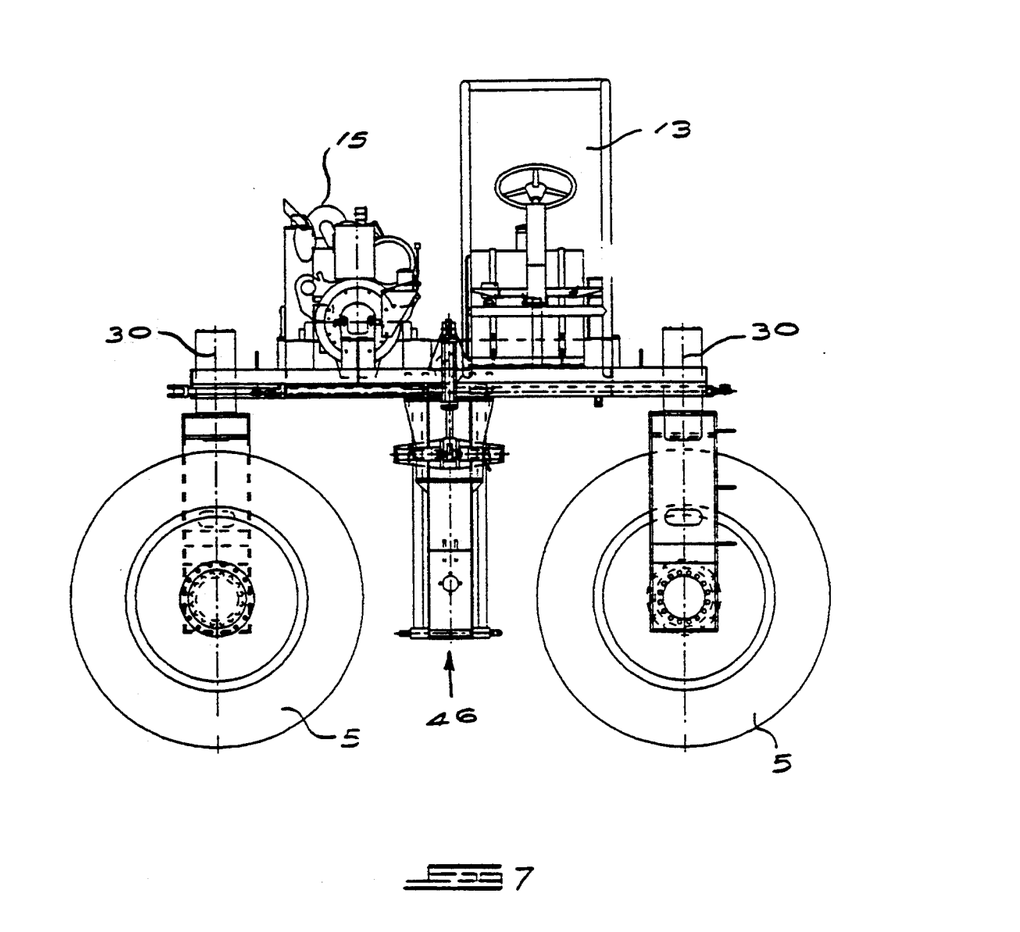
FIG. 7 shows a front view of the vehicle with the front wheels turned at 90° to the normal forward travel direction.
Figure 8:
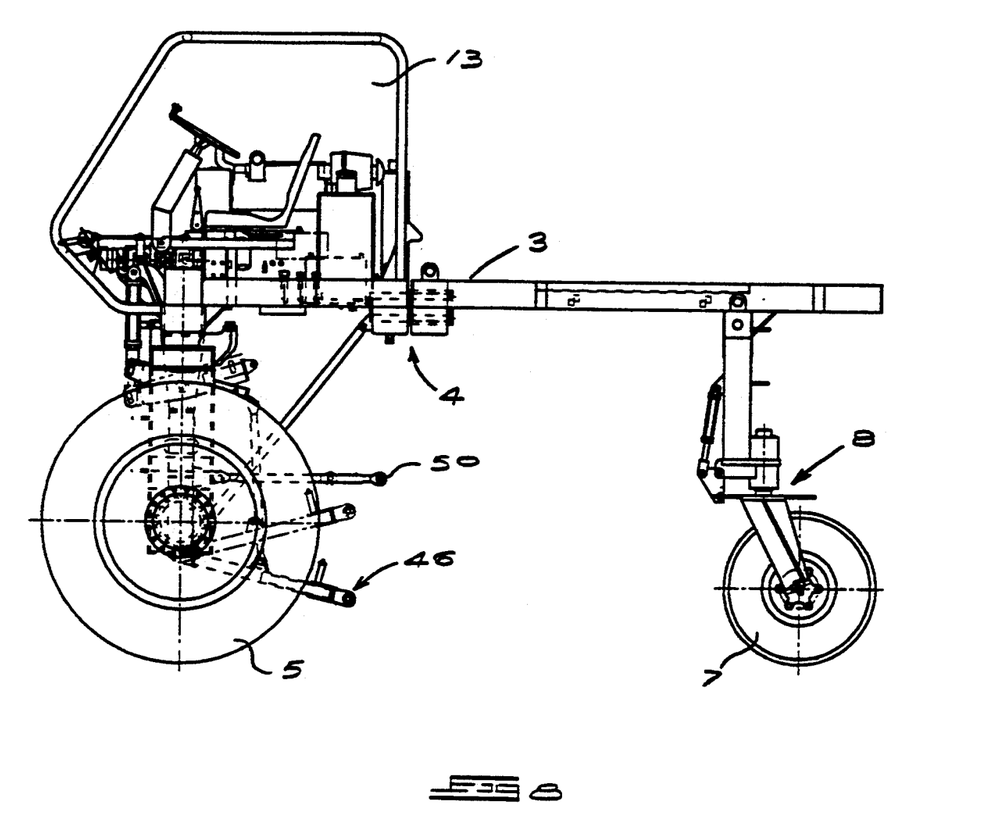
FIG. 8 shows a side view of the vehicle with a conventional three-point implement attachment mount fitted thereto.

The front wheels 5 are linked together by a link member 36 which holds the two wheels 5 parallel with each other. A hydraulically powered piston and cylinder assembly 38 is used for power steering of the vehicle. The piston and cylinder assembly 38 will be powered by hydraulic fluid under pressure supplied by the pump 17. The piston and cylinder assembly 38 has a sufficiently long stroke such that the front wheels can be steered in a normal forward travel direction, as shown in FIG. 2 but can also be pivoted on axes 30 through 90° (or slightly more) as shown in FIGS. 5 and 7, into a lateral travel position. It will be noted in FIG. 5 that the piston and cylinder assembly 38 has been contracted into its shortest condition. The tie 36 has kept the two front wheels 5 parallel with each other.

The feed of hydraulic fluid to the piston and cylinder assembly 38 will be controlled by steering wheel 40. Clearly, rotation of the steering wheel 40 to the left will cause hydraulic fluid to be fed to piston and cylinder assembly 38 to cause contraction of the assembly 38 and thereby cause the wheels 5 to turn to the left. Turning the steering wheel 40 to the right has the opposite effect. Skid steering of the vehicle will be controlled by pedals 42. The pedals 42 are linked to the pump 17 via control rods 43 for the control of hydraulic fluid to the motors 20.

Figure 4:
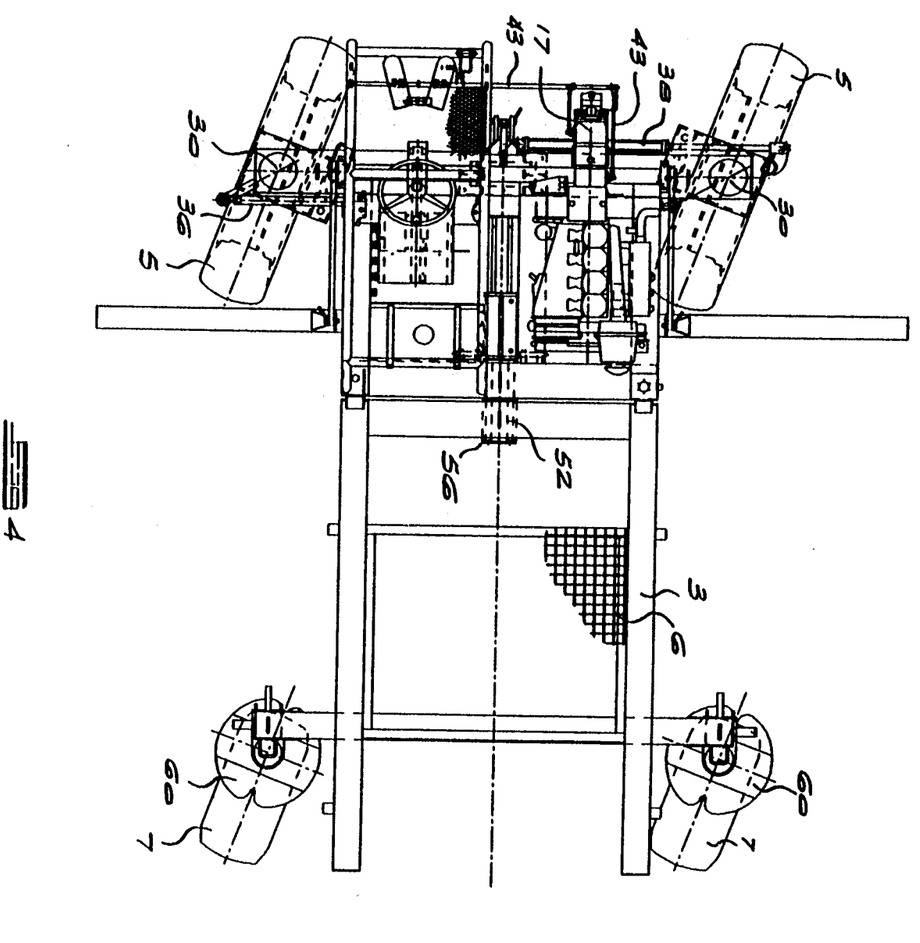
FIG. 4 shows a similar view to that of FIG. 2 but with the wheels turned at 20° to the right.

With the arrangement of the piston and cylinder assembly 38 and the link 36 it is envisaged that the front wheels will be capable of pivoting on axes 30 through an arc of 120° between left wheel lock and right wheel lock. That arc will be offset from the longitudinal centreline 42 of the vehicle. Left wheel lock (FIG. 5) will be approximately 100° to the left of centreline 42, and right wheel lock (FIG. 4) will be 20° to the right of centreline 42. For normal forward driving steering will generally be in the arc 20° to the left or right of the centreline 42. The term "normal forward travel" as used herein will mean in a direction straight ahead of the vehicle, i.e., with the front wheels parallel with centreline 42.

It will be appreciated that with the wheels turned perpendicular to the centreline 42 (see FIG. 7) the vehicle can be driven laterally, i.e., at 90° to the direction of normal forward travel. This permits the vehicle to traverse sideways over an agricultural implement so that the agricultural implement can be located in the space 44 between the front and rear wheels. The vehicle may also traverse sideways at the end of a row of crops or in other situations where tight manoeuvring is necessary.

The vehicle is provided with a conventional three point tractor hitch 46. This hitch is mounted to the front frame 2 between the wheels 5. It can be raised or lowered by piston and cylinder assembly 48 and has an hydraulically driven power take-off 50. All conventional agricultural implements can thus be hitched to the vehicle, even wide implements which may need to positioned using the aforementioned lateral travel manoeuvre.

Figure 6:
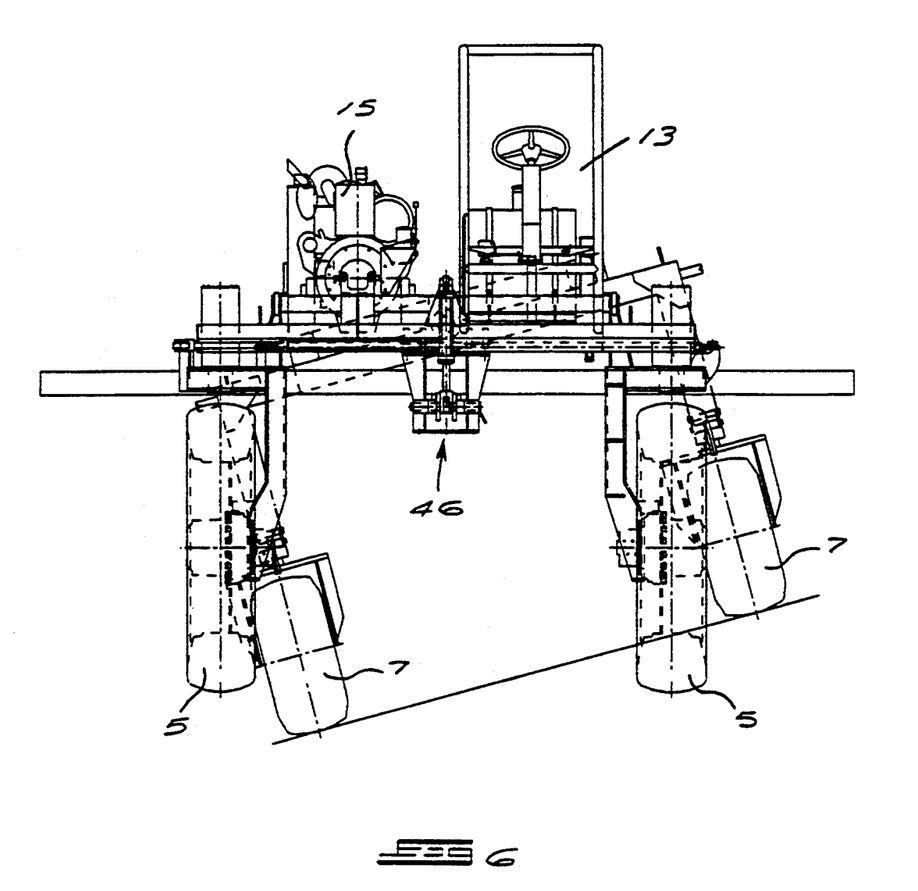
FIG. 6 shows a front view of the vehicle indicating the cross-over movement of the front wheels relative to the rear wheels.

The pivot arrangement 4 comprises a shaft 52 mounted in bearings 54 and 56 which in turn are mounted to the front and rear frames respectively. The front and rear frames are able to pivot relative to each other on pivot axis 58 which is coincident with longitudinal centreline 42. The manner of this pivoting is depicted in FIG. 6 of the drawings. This arrangement enhance the stability of the vehicle since all four wheels 5, 7 will be kept in contact with the ground even where the vehicle is travelling over uneven terrain.

The rear wheels 7 can be locked in a forward position. Each castor assembly 8 includes a generally horizontal locating plate 60 which is fixed to pivot with the wheel 7 and shaft 11. A piston and cylinder assembly 62 is fixed to support leg 64 and drives a locking plate 66. The locating plate 60 has a pair of locating slots 68, 70 in the periphery thereof. In use, the locking plate 66 can be slotted into the forward locating slot 68 to lock the rear wheels in a forward travel position, and in locating slot 70 to lock the rear wheels in reverse travel position. Locking the rear wheels 7 in this manner will stabilize the travel of the vehicle under forward and reverse travel conditions. A switch (not shown) operable from the cab 13 will be used to drive the piston and cylindrical assemblies 62 to engage or disengage the locking plates 66.

It is envisaged that conventional ploughs, harvesters, scarifiers, rollers, automatic planters, and the like could be mounted in the space 44. It will be appreciated that with conventional tractors having a three point linkage located behind the vehicle, a load as would be provided by a plough would tend to lift the front of the tractor off the ground which makes steering difficult. As is well known in the art, many tractors carry a large weight on the front of the vehicle to counter balance the lifting force provided by the load on the rear of the vehicle. This adds considerably to the overall weight of the vehicle and when the vehicle is not loaded by the plough the weight makes steering difficult. In the present arrangement the load provided by the mid mounted implement acts to enhance the steering and drive traction of the front wheels 5 and therefore no additional weight will be required in order to effect satisfactory steering and drive traction.

It will be appreciated from the aforegoing that the vehicle can be used in a number of different situations with a number of different implements attached thereto. It will work equally well with a low crop tractor type implements attached thereto as well as high crop implements attached thereto. It is envisaged that at least some farmers could use this vehicle for both low crop and high crop type applications. Accordingly the farmer would need to purchase only a single tractor type vehicle to service all of his needs. As it is envisaged that the vehicle will be relatively inexpensive and that the different parts thereof could be made as separable components which a farmer would purchase to suit his particular application. Thus, the rear frame 3 need not be of the specific form as depicted in the drawing and a range of different rear type assemblies could be fitted. The vehicle could be used as a substantially convention truck provided a suitable rear load carrying body is attached to the front frame.

Finally, it is to be understood that various alterations, modifications and/or additions may be introduced into the construction and arrangements of parts previously described without departing from the spirit or ambit of the invention as defined in the appended claims.

We claim:

1. A high crop agricultural vehicle comprising, a chassis on which is mounted a drive unit and a drivers cab with steering and drive controls, a pair of front wheels mounted to the chassis and spaced apart from each other in linked parallel relationship, a pair of rear wheels mounted to the chassis and spaced apart from each other, said front and rear wheels pairs defining a space between them, the wheels supporting the chassis at an elevated position such that in use, the vehicle can be driven over relatively high crops, drive means linking the drive unit to the front wheels, steering means controllable by the steering controls which is capable of steering the vehicle to the left and right of a normal forward travel direction, the front wheels being turnable to at least through 90° either to the left or right of said normal forward travel direction so that the front wheels adopt a lateral travel position, the vehicle being capable of being driven in a lateral direction when the front wheels are in said lateral travel position, said front wheels being steerable by the steering means when in the lateral travel position.

2. A vehicle according to claim 1 wherein the rear wheels are connected to the chassis through a castor assembly.

3. A vehicle according to claim 3 wherein the rear wheels are lockable in a forward travel direction.

4. A vehicle according to claim 1 wherein the chassis is comprised of two frames, a front frame and a rear frame, and the two frames are connected to each other through an articulated connection which allows the rear frame to pivot relative to the front frame about a pivot axis which is generally horizontal and is aligned with the direction of normal forward travel of the vehicle.

5. A vehicle according to claim 4 wherein the drive unit and the driver's cab are mounted on the front frame.

6. A vehicle according to claim 1 wherein the front wheels are mounted to the chassis through a pivot connection which includes a vertically aligned pivot axis about which the front wheels can pivot between said forward travel position and said lateral travel position.

7. A vehicle according to claim 1 which includes a conventional three point connection arrangement positioned in the space between the front and rear wheels to which agricultural implements of generally standard configuration can be connected.

8. A high crop agricultural vehicle comprising a chassis on which is mounted a drive unit and a drivers cab with steering and drive controls, a pair of front wheels mounted to the chassis and spaced apart from each other in linked parallel relationship, a pair of rear wheels mounted to the chassis and spaced apart from each other, said front and rear wheel pairs defining a space between them, the wheels supporting the chassis at an elevated position such that, in use, the vehicle can be driven over relatively high crops, drive means linking the drive unit to the front wheels, steering means controllable by the steering controls which is capable of steering the vehicle to the left and right of a normal forward travel direction, the front wheels being turnable to at least through 90° either to the left or right of said normal forward travel direction so that the front wheels adopt a lateral travel position, the vehicle being capable of being driven in a lateral direction when the front wheels are in said lateral travel position, said front wheels being steerable by the steering means when in the lateral travel position, wherein the drive unit encompasses an internal combustion engine which in turn drives a hydraulic pump, and each of the front wheels houses a hydraulic motor adapted to be driven by pressurised fluid from the hydraulic pump, and wherein the front wheels are steerable both by independently controlling the drive to the respective hydraulic motors in each of the wheels, and by said steering means.

* * * * *